United States Patent [19]

Stephens et al.

[11] Patent Number: 5,208,276
[45] Date of Patent: May 4, 1993

[54] TIRE TREAD COMPOUND

[75] Inventors: Paul Stephens, Halesowen; Andrew Chanse, Atherstone, both of Great Britain

[73] Assignee: Sumitomo Rubber Industries Limited, Hyogo, Japan

[21] Appl. No.: 713,097

[22] Filed: Jun. 11, 1991

[30] Foreign Application Priority Data

Jun. 15, 1990 [GB] United Kingdom ............... 9013369

[51] Int. Cl.$^5$ .............................................. C08L 51/04
[52] U.S. Cl. .................................... 523/436; 524/495; 524/496
[58] Field of Search .................. 523/438; 524/495, 496

[56] References Cited

U.S. PATENT DOCUMENTS

| | | | |
|---|---|---|---|
| 3,864,305 | 2/1975 | Jordan et al. | 524/496 |
| 4,035,336 | 7/1977 | Jordan et al. | 524/495 |
| 4,357,432 | 11/1982 | Edwards | 523/351 |
| 4,820,751 | 4/1989 | Takeshita et al. | 524/495 |

FOREIGN PATENT DOCUMENTS 2457446 6/1976 Fed. Rep. of Germany .
62-13445 1/1987 Japan .

OTHER PUBLICATIONS

EMS-Grilonit Technical Brochure and DIN Safety Data Sheet.

Primary Examiner—Paul R. Michl
Assistant Examiner—Edward Cain
Attorney, Agent, or Firm—Birch, Stewart, Kolasch & Birch

[57] ABSTRACT

A tire tread compound, particularly useful for truck tires, comprises a base polymer of natural or synthetic rubber, a filler at least 50% of which is carbon black and between 2 and 10 parts of epoxy resin per hundred parts of polymer.

4 Claims, No Drawings

TIRE TREAD COMPOUND

This invention relates to a tire tread compound and in particular to a tread compound suitable for truck tires.

Truck tires are subject to heavy impacts and high abrasion particularly in off-the-road use and so their tread compounds have to have a high hardness to give the required penetration and wear resistances but also a sufficiently low modulus to prevent tearing off of tread blocks or lugs. Accordingly the formulations used have to be a compromise between these two necessary properties.

It is an object of the present invention to provide a tire tread compound in which the traditional combination of wear and damage resistance can be substantially improved.

According to one aspect of the present invention a tire tread compound comprises a base polymer of natural or synthetic rubber, a filler at least 50% of which is carbon black and between 2 and 10 parts per hundred of polymer of epoxy resin.

The epoxy resin is preferably of the type sold under the name GRILONIT L 1204-1 (Trade Mark of EMS Grilon) and has properties as follows:

| | |
|---|---|
| Density | 1.17 cm$^{-3}$ |
| Epoxy number | 0.10–0.118 |
| Epoxide equivalent weight | 850–1000 |
| Durran softening point | 93–102° C. |
| Equivalent weight of esterification | 170–180 |
| Chlorine content | 0.25% max |
| Hydrolyzable chlorine | 0.06% max |
| Viscosity 40 solution in dibutyl glycol | 450–650 m Pa s |

More preferably the amount of epoxy resin is in the range of 2–8 parts per 100 of polymer.

Preferably the amount of carbon black filler is in the range of 30–65 parts per hundred of polymer.

The filler may comprise silica for that part which is not carbon black.

It has been found that the above compound provides a high hardness and a modulus at 300% elongation which is less than would be normal for a compound of this hardness. The result of this is that the necessary tread hardness for wear and penetration resistance can be provided with lower modulus at high strain and therefore improved damage resistance.

Thus the material has greatly improved properties compared with the normal tread compounds used for truck tires, especially for off-the-road applications.

Further aspects of the present invention will become apparent from the following description of embodiments of the invention.

Tire tread compounds for a truck tire were formulated according to Table 1. The first example is a comparative example and the others are examples according to the present invention.

The resultant compounds had the properties in Table 2.

Thus it can be seen that the compound of the invention provided properties of improved hardness particularly when more than two parts of the epoxy were used but lowered 300% modulus. Such materials are particularly useful for off-the-road truck tire tread compounds where damage resistance and good wear resistance are both required.

A further embodiment is shown below:

| Ingredient | Theoretical PPR | % |
|---|---|---|
| NR9720 | 100.00 | 57.67 |
| Renacit 7 | 0.15 | 0.09 |
| Zinc Oxide | 4.00 | 2.31 |
| Stearic acid | 2.00 | 1.16 |
| 6PPD | 1.50 | 0.87 |
| Wingstay 100 | 1.00 | 0.58 |
| Microcrystaline Wax | 2.00 | 1.16 |
| Resin L1204.1 | 5.00 | 2.88 |
| N110 black | 30.00 | 17.31 |
| N326 black | 10.00 | 5.77 |
| PPT silica | 15.00 | 8.65 |
| Sulphur 110 mesh | 1.00 | 0.58 |
| MBS | 1.50 | 0.87 |
| TMTD | 0.20 | 0.12 |

In this compound a composite filler of black and silica was used which formulation is particularly advantageous for off-the-road truck tire tread compounds and indeed for use in earthmover tires.

TABLE 1

| | Formulations | | | | | |
|---|---|---|---|---|---|---|
| | A | B | C | D | E | F |
| SMR 20 | 100.00 ) | | | | | |
| Zinc oxide | 2.30 ) | | | | | |
| Stearic acid | 3.00 ) | | | | | |
| Black N110 | 29.00 ) | | | | | |
| Black N326 | 19.00 ) | | | | | |
| Wax | 1.00 ) | | | | | |
| IPPD | 1.00 ) | | | | | |
| 75% BLE | 1.33 ) | | | | | |
| Renacit VII | 0.15 ) | | | | | |
| Resin L1204.1 | — | 0.50 | 1.00 | 2.00 | 4.00 | 8.00 |
| Sulphur | 1.50 ) | | | | | |
| MBS | 1.00 ) | | | | | |

TABLE 2

| | | A | B | C | D | E | F |
|---|---|---|---|---|---|---|---|
| Tensile strength | (MPa) | 27.9 | 27.3 | 27.6 | 27.1 | 26.5 | 24.6 |
| Modulus @ 300% Ext | (MPa) | 11.5 | 12.0 | 11.8 | 11.3 | 10.9 | 9.5 |
| Elong @ break | (%) | 550 | 550 | 548 | 550 | 562 | 582 |
| Hardness | (IRH°) | 67.0 | 66.5 | 68.4 | 69.9 | 72.1 | 79.7 |
| Resilience | (%) | 69.2 | 69.9 | 67.4 | 67.2 | 65.6 | 59.9 |
| Rheometer Properties R100 @ 145° C. | | | | | | | |
| Plasticity | (in lbs) | 18.2 | 17.7 | 18.0 | 17.2 | 17.2 | 16.4 |
| Scorch | (mins) | 5.3 | 5.8 | 5.8 | 7.0 | 6.8 | 6.7 |
| Cure rate | (mins) | 2.1 | 2.3 | 2.3 | 2.7 | 3.4 | 4.1 |
| Opt. torque | (in lbs) | 69.2 | 66.4 | 66.6 | 64.3 | 61.7 | 56.0 |
| T90% | (mins) | 12.7 | 12.5 | 12.5 | 14.5 | 15.5 | 18.5 |
| Mooney @ 120° C. | | | | | | | |
| Plasticity | | 67.0 | 62.5 | 64.0 | 62.0 | 62.0 | 59.0 |

TABLE 2-continued

|  |  | A | B | C | D | E | F |
|---|---|---|---|---|---|---|---|
| Scorch | (mins) | 23.5 | 25.0 | 26.5 | 32.0 | 34.0 | 35.0 |

Having now described the invention what we claim is:

1. A tire tread compound comprising a base polymer of natural or synthetic rubber; a filler comprising at least 50% carbon black, and silica; and between 2 and 10 parts of epoxy resin per hundred of said base polymer of natural or synthetic rubber.

2. The tire tread compound according to claim 1, wherein the amount of said epoxy resin is between 2 and 8 parts per 100 of said base polymer of natural or synthetic rubber.

3. The tire tread compound according to claim 1, wherein said carbon black is in the range of 30-65 parts per hundred of said base polymer of natural or synthetic rubber.

4. The tire tread compound according to claim 1, wherein the amount of said filler is in the range of 40-65 parts per hundred of said base polymer of natural or synthetic rubber.

* * * * *